United States Patent
Frodigh et al.

[11] Patent Number: 5,920,818
[45] Date of Patent: Jul. 6, 1999

[54] APPARATUS AND METHOD FOR CONTROLLING COMMUNICATIONS IN A MULTI-NETWORK, WIRELESS COMMUNICATION SYSTEM

[75] Inventors: Carl Magnus Frodigh, Kista; John Tomas Robert Dannelind, Solna; Håkan Gunnar Olofsson, Stockholm; Yngve Kenneth Wallstedt, Solna; Jonas Lennart Wiorek; Fredric Carl Ulf Kronestedt, both of Stockholm, all of Sweden

[73] Assignee: Telefonaktiebolaget L M Ericsson (publ), Stockholm, Sweden

[21] Appl. No.: 08/759,939

[22] Filed: Dec. 3, 1996

[51] Int. Cl.⁶ .................................... H04B 1/00
[52] U.S. Cl. .................. 455/443; 455/440; 455/437; 455/444; 370/331
[58] Field of Search ............... 455/76, 15, 436, 455/437, 411, 11.1, 439, 445, 449, 433, 440, 426, 441, 444, 524, 525, 560, 554, 421, 443; 342/457; 371/5.1, 5.5; 370/331

[56] References Cited

U.S. PATENT DOCUMENTS

| | | | |
|---|---|---|---|
| 4,475,010 | 10/1984 | Huensch et al. | 179/2 |
| 5,313,489 | 5/1994 | Menich et al. | 370/332 |
| 5,349,631 | 9/1994 | Lee | 379/59 |
| 5,353,332 | 10/1994 | Raith et al. | 455/455 |
| 5,355,520 | 10/1994 | Freeburg et al. | 455/53.1 |
| 5,392,453 | 2/1995 | Gudmundson et al. | 455/33.2 |
| 5,394,158 | 2/1995 | Chia | 342/457 |
| 5,513,246 | 4/1996 | Jonsson et al. | 455/33.2 |
| 5,517,674 | 5/1996 | Rune | 455/33.2 |
| 5,564,121 | 10/1996 | Chow et al. | 455/53.1 |
| 5,590,177 | 12/1996 | Vilmur et al. | 379/60 |
| 5,594,947 | 1/1997 | Grube et al. | 455/54.2 |
| 5,598,459 | 1/1997 | Haartsen | 379/58 |
| 5,613,205 | 3/1997 | Dufour | 455/440 |
| 5,640,677 | 6/1997 | Karlsson | 455/33.2 |
| 5,648,961 | 7/1997 | Ebihara | 370/282 |
| 5,673,307 | 9/1997 | Holland et al. | 379/60 |
| 5,722,044 | 2/1998 | Padovani et al. | 455/33.1 |
| 5,740,537 | 4/1998 | Beming et al. | 455/450 |

FOREIGN PATENT DOCUMENTS

| | | |
|---|---|---|
| 0 505 105 | 9/1992 | European Pat. Off. . |
| WO 96/31078 | 10/1996 | WIPO . |
| WO 97/13386 | 4/1997 | WIPO . |

*Primary Examiner*—Wellington Chin
*Assistant Examiner*—Isaak R. Jama
*Attorney, Agent, or Firm*—Jenkens & Gilchrist, P.C.

[57] ABSTRACT

Apparatus, and an associated method, controls operation of a mobile terminal operable in a communication system having two network portions. Selective permission of cell selection of communications between the two network portions better assures that the mobile terminal, when positioned in an area intended to be encompassed by one of the network portions, communicates with that network portion.

32 Claims, 7 Drawing Sheets

APPARATUS AND METHOD FOR CONTROLLING COMMUNICATIONS IN A MULTI-NETWORK, WIRELESS COMMUNICATION SYSTEM

CROSS-REFERENCE TO RELATED APPLICATIONS

The present invention is related to co-pending patent application Ser. No. 08/540,326 filed on Oct. 6, 1995, patent pending entitled "Distributed indoor Digital Multiple-Access Cellular Telephone System", the contents of which are incorporated by reference herein.

The present invention relates generally to a wireless communication system having at least two communication network portions, such as a macrocellular network portion and a microcellular network portion, and a mobile terminal, the mobile terminal capable of communicating with another communication station by way of either of the communication network portions. More particularly, the present invention relates to apparatus, and associated method, for controlling communications of the mobile terminal with the other communication station by way of a selected one of the network portions.

Operation of an embodiment of the present invention, for example, selectively permits cell selection of communications with a mobile terminal between the two wireless network portions. During ongoing communications by the mobile terminal, for instance, hand-over of ongoing communications by the mobile terminal between the first and second network portions is selectively permitted. Hand-over of the communications is permitted only when the mobile terminal is positioned at a defined gateway area, which forms a gateway between intended areas of coverage of the two network portions. By controlling through which of the communication network portions the mobile terminal is permitted to communicate, communication by the mobile terminal with a particular one of the networks, when positioned at an area intended to be encompassed by that network, is better assured.

When, for example, the communication system is formed of a macrocellular network portion and a microcellular network portion, operation of the present invention can better assure that the mobile terminal communicates with another communication station by way of the microcellular network portion when positioned in an area intended to be encompassed by the microcellular network portion. Better advantage can thereby be made of the lower costs, and other advantages, sometimes associated with communication by way of a microcellular network.

BACKGROUND OF THE INVENTION

A communication system is formed, at a minimum, by a transmitter and a receiver interconnected by a communication channel. Communication signals generated by the transmitter are transmitted upon the communication channel to be received by the receiver.

A radio communication system is a communication system in which the communication channel is formed of a portion of the electromagnetic frequency spectrum. Because a fixed or hard-wired connection is not required to be formed between the transmitter and the receiver, a radio communication system is advantageously utilized when the use of such fixed or hard-wired connections would be inconvenient or impractical.

A communication system, sometimes generically referred to as a "cellular" communication system is exemplary of a radio communication system. When the infrastructure, also referred to as the network, of a cellular communication system is installed throughout a geographical area, a subscriber, positioned at any location throughout the area encompassed by the system, is able to communicate by way of the system with a mobile terminal.

The network of one exemplary cellular communication system is formed of spaced-apart, fixed-site base stations which include transceivers. In such exemplary system each fixed-site, base station defines a "cell." As the mobile terminal used by the subscriber to communicate with another communication station travels between cells, uninterrupted communication is possible by "handing-over" communications from one base station to another.

Several analogous types of wireless communication systems have been implemented, and others have been proposed, to encompass limited areas, such as the area encompassed by a building structure or office workplace. Because the areas intended to be encompassed by such systems are typically fairly small, the networks of such systems are sometimes referred to as microcellular networks. Such networks are sometimes also referred as indoor networks. And, because such networks are also sometimes permitted to be used only by selected groups, such as employees of a business in which the networks are installed, the networks are sometimes also referred to as private networks. While the description herein utilizes such terminology, it should be understood that such networks need not be installed only in indoor areas or that such networks define cells of only small areas.

Networks, typically having a large number of fixed-site transceivers spaced-apart over a large area, in contrast, are sometimes referred to as macrocellular or outdoor networks. Also, such networks are sometimes also referred to as being public networks as subscriptions for service pursuant to such networks are typically available to the general public. While such terminology is also used herein, it should also be understood that such networks need not be installed only to encompass outdoor areas, define cells of only large areas, or be public in nature. Such networks might well include cells of both large and small areas and cells intended to encompass only indoor areas as well as cells intended to encompass outdoor areas. A communication system might be formed to include both a macrocellular network and a microcellular network, each network forming a portion of the infrastructure of the communication system. The terms macrocellular network portion and microcellular network portion shall be used below to indicate that such networks may form portions of the communication system.

Mobile terminals have been constructed in which communications are permitted therethrough with both the macrocellular communication network portion and a microcellular communication network portion. When the mobile terminal is positioned within an area intended to be encompassed by a microcellular network portion, communication with the microcellular network portion can be effectuated. And, when the mobile terminal is positioned at a location encompassed by a macrocellular communication network portion, communication can be effectuated between the mobile terminal and the macrocellular network portion.

Costs associated with communicating by way of a microcellular network portion are sometimes less than corresponding costs associated with communicating by way of a macrocellular network. Also, higher levels of services, e.g., additional service subscriptions for premium service features, might be available in the microcellular network portion but not in the macrocellular network portion. Also, security levels might be higher in the microcellular network portion, e.g., the microcellular network portion might be a proprietary network. Therefore, when a mobile terminal is positioned within an area intended to be encompassed by the microcellular cellular network portion, it is generally desirable that communications utilizing the mobile terminal be effectuated by way of the microcellular network portion.

Mobile terminals operable in a communication system having both a microcellular network portion and a macrocellular network portion are sometimes able to make signal strength, or other signal quality, measurements of control signals generated by fixed-site transceivers of the networks. Based upon such signal strength, or other signal quality, measurements, decisions are made as through with which fixed-site transceiver the mobile terminal should communicate. Such decisions might also be determinative of through which of the network portions the mobile terminal communicates. Hand-over requests of ongoing communications are also made based upon such measurements.

In a communication system in which the mobile terminals do not make such measurements, analogous measurements are made by the communication system infrastructure.

Measurements, either those made by a mobile terminal or those made at the infrastructure, are made when the mobile terminal is in the active mode, i.e., when the mobile terminal is being used in on-going communications.

Measurements might also be made when the mobile terminal is in the idle mode, i.e., when the mobile terminal is turned-on, but not used in ongoing communications.

As mentioned above, it is usually desirable for a mobile terminal to communicate with another communication station by way of a microcellular network portion when the mobile terminal is positioned in an area intended to be encompassed by the microcellular network portion. Actual coverage areas of the macrocellular and microcellular network portions might, however, overlap.

That is, even though the network portions are constructed such that the microcellular network portion is intended to encompass a particular, defined area, the actual coverage areas encompassed by the different network portions might overlap. Because of such overlap, a handover may be possible from a coverage point of view and a mobile terminal might be instructed to communicate by way of a fixed-site transceiver of one network portion when positioned at a location intended to be encompassed by the other network portion.

For instance, when a microcellular network forming a portion of a communication system is constructed within a building, communication by a mobile terminal with another communication station, when positioned within the building, would generally be desired to be effectuated with the microcellular network portion. Only when the mobile terminal exits the building should handover of communications by way of the macrocellular network portion be permitted. However, when the coverage areas of the network portions overlap, measurements by the mobile terminal might indicate that the mobile terminal should be communicating by way of one of the network portions when positioned at a location intended to be encompassed by the other network portion.

When, for example, the mobile terminal is positioned close to a window or other exterior portion of the building in which the microcellular network portion is installed, measurements taken by the mobile terminal might indicate that the mobile terminal should be communicating by way of a fixed-site transceiver of the macrocellular network portion rather than the microcellular network portion. When communications are ongoing when such a measurement is made, an attempt to hand-over the ongoing communications from the microcellular network portion to the macrocellular network portion might be made. If permitted, the advantages associated with communicating by way of the microcellular network portion would be obviated.

A manner by which better to control through which of the network portions the mobile terminal is permitted to communicate with another communication station would therefore be advantageous.

It is in light of this background information related to communications in a wireless communication system having at least two network portions, such as a macrocellular network portion and a microcellular network portion, that the significant improvements of the present invention have evolved.

SUMMARY OF THE INVENTION

The present invention advantageously provides a manner by which to facilitate better control over the selection of wireless communication network portions of a communication system through which the mobile terminal communicates with another communication station. Cell selection of communications by a mobile terminal is selectively permitted. When the mobile terminal is being used in ongoing communications, hand-over of the ongoing communications by the mobile terminal between fixed-site transceivers of first and second network portions is controlled. Better assurance is provided such that, when the mobile terminal is positioned at a location intended to be encompassed by one of the wireless network portions, the mobile terminal communicates by way of the intended network portion rather than another network portion.

Cell selection, such as hand-over between network portions of the ongoing communications by the mobile terminal, is permitted only when the mobile terminal is positioned at a defined gateway area, defined at a gateway between the network portions. By controlling through which of the communication network portions that the mobile terminal is permitted to communicate, communication by the mobile terminal by way of a particular one of the network portions when positioned at an area intended to be encompassed by that network portion is better assured.

In one aspect of the present invention, a communication system is formed of a macrocellular network portion and a microcellular network portion. The microcellular network portion is installed in a building structure or other defined area. A mobile terminal is selectively operable to communicate, alternatively by way of the macrocellular network portion and by way of the microcellular network portion. A gateway area forms a gateway to the area intended to be encompassed by the microcellular network portion.

The gateway is formed at, for example, an entranceway to the defined area intended to be encompassed by the microcellular network portion. Cell selection, such as hand-over of ongoing communication between the two network portions, is permitted only when the mobile terminal is detected at the gateway area. If a request for cell selection, such as the hand-over of ongoing communication between network portions, is made when the mobile terminal is detected at a location other than the gateway area, such request for a hand-over is denied. When the areas actually encompassed by the macrocellular and microcellular network portions overlap, measurements of the signal quality levels of control signals generated by fixed-site transceivers of the respective network portions might indicate that the cell selection, such as the hand-over of communications between network portions, should be effectuated. By preventing possible cell selection, such as the hand-over of communications between the network portions, but for when the mobile terminal is positioned at a gateway area, better utilization of communications by way of the microcellular network portion, and its comparative cost advantages, is better assured.

In another aspect of the present invention, a communication system is formed of a conventional macrocellular communication network portion having "outdoor" cells and a microcellular network portion. The microcellular network portion is formed of, e.g., a base station having distributed transceiver portions, such as remote antenna devices, distributed throughout a defined area. A gateway area is defined by the coverage area of an additional base station having a coverage area encompassing a gateway to the defined area. Cell selection, such as a hand-over of ongoing communications, between the macrocellular network portion and the microcellular network portion is permitted only when the mobile terminal is detected to be positioned at the gateway area.

Neighbor cell lists associated with the base stations of the macrocellular communication network portion, the base station of the microcellular network portion, and the base station having the coverage area encompassing the gateway include listings of permissible "neighbors" available for which cell selections, such as hand-overs of communications by a mobile terminal, are permitted.

The neighbor cell list associated with the base station of the microcellular network portion includes the identity of the base station encompassing the gateway area formed at the gateway to the area intended to be encompassed by the microcellular network portion, but not the identity of base stations of the macrocellular network. Cell selection, such as hand-over of ongoing communication by a mobile terminal with the base station of the microcellular network portion, can only be effectuated to the base station positioned at the gateway area.

The neighbor cell lists associated with the base stations of the macrocellular network portion, other than the base station having the coverage area which encompasses the gateway area, do not include the identity of the base station of the microcellular network portion. Therefore, hand-over of communications, or other cell selection, directly from such base stations of the macrocellular network portion to the base station of the microcellular network portion can not occur. Only the neighbor cell list associated with the base station positioned at the gateway area includes the identities of both base stations of the macrocellular network portion and the microcellular network portion. Thereby, the communication network portion through which the mobile terminal is permitted to communicate is controlled.

When a mobile terminal positioned within the area intended to be encompassed by the microcellular network portion is communicating therewith, a hand-over of ongoing communications can only be effectuated to the base station associated with the gateway area due to the assignation of the identity of the gateway base station in the neighbor cell list associated with the base station of the microcellular network portion.

Analogously, communications of a mobile terminal with a base station of the macrocellular network portion can not be handed-over directly to the base station of the microcellular network portion. Instead, hand-over of ongoing communications is only permitted with the base station positioned at the gateway area. And, communications by a mobile terminal with the base station positioned at the gateway area are permitted to be handed-over to base stations of either the macrocellular network portion or the microcellular network portion. Thereby, the base station positioned at the gateway area forms a communication gateway between the microcellular network and macrocellular network portions.

In another aspect of the present invention, a communication system is formed of a macrocellular network portion having base stations of a conventional, macrocellular communication network and a microcellular network portion having a central control unit and a plurality of antenna devices, distributed about an area intended to be encompassed by the indoor network. A distributed antenna device positioned proximate to a gateway to the area intended to be encompassed by the indoor network is defined to be a gateway antenna. The central control unit of the indoor network permits hand-over of communications between the microcellular and macrocellular network only when the mobile terminal is determined to be positioned at the gateway area defined by the gateway antenna.

In these and other aspects, therefore, a communication system has a first wireless network portion permitting a mobile terminal to communicate therewith when positioned in a first area. The first area is intended to be encompassed by the first wireless network portion. A second wireless network portion permits the mobile terminal to communicate therewith when positioned in a second area. The second area is an area intended to be encompassed by the second wireless network portion. Apparatus selectively permits cell selection for the mobile terminal to be alternately with the first and second wireless network portions. At least one detector detects when the mobile terminal is positioned at a selected gateway area. The selected gateway area is positioned about a selected gateway between the first wireless network portion and the second wireless network portion. The gateway area forms a portion of a selected one of the first area and the second area. The at least one detector further generates a signal indicative of detection thereat of positioning of the mobile terminal at the selected gateway area. A controller is coupled to receive the signal indicative of the positioning of the mobile terminal at the gateway area. The controller permits the cell selected for the mobile terminal to be a selected one of the cells of the first wireless network portion and the second wireless network portion when the signal indicative of the positioning of the mobile terminal at the gateway area is received thereat. Cell selection for the mobile terminal is prohibited from being altered between the first wireless network portion and the second wireless network portion if the controller fails to receive the signal indicative of the positioning of the mobile terminal at the selected gateway area.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
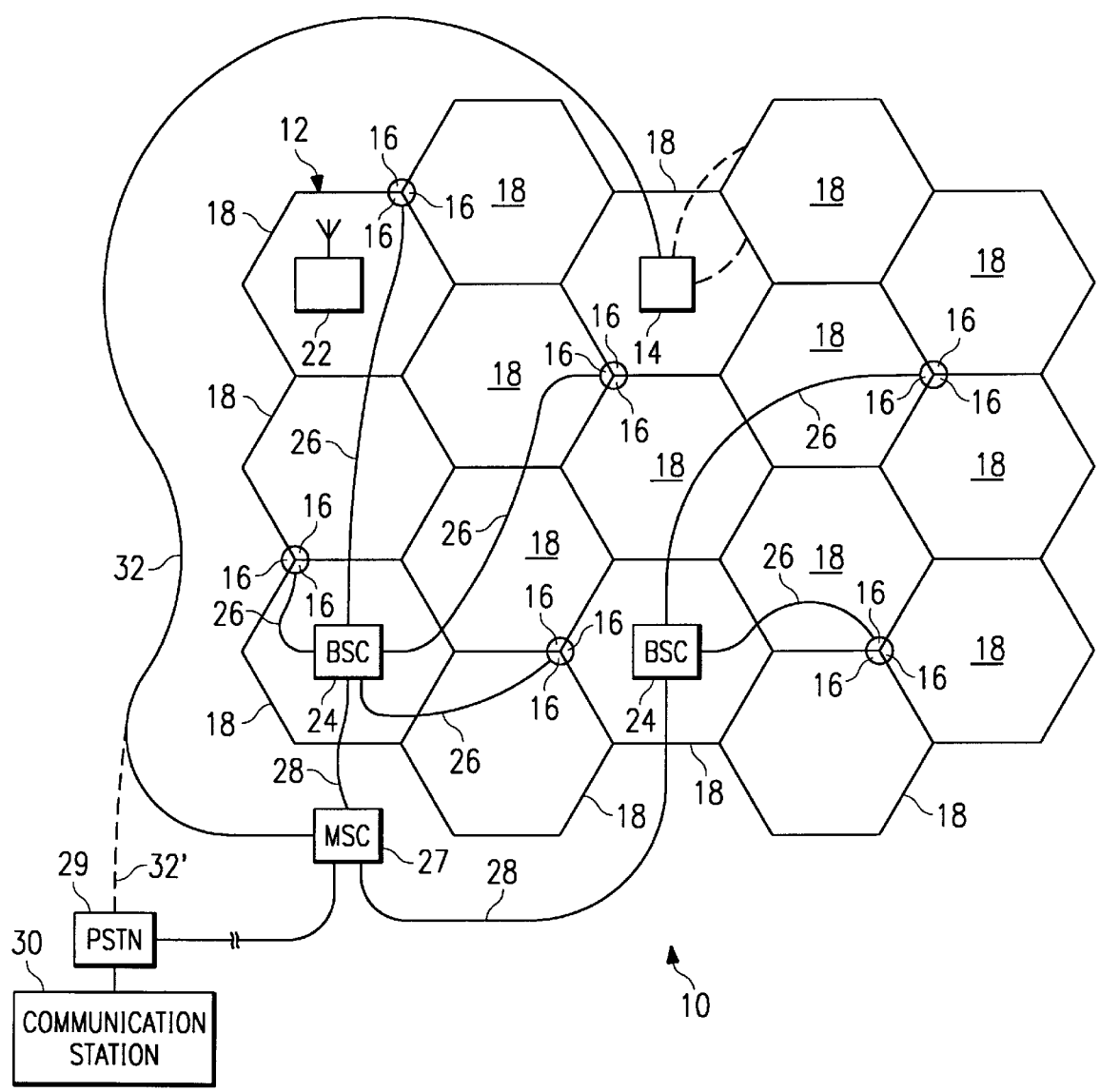
FIG. 1 illustrates a functional block diagram representative of a communication system having a macrocellular network portion and a microcellular network portion in which an embodiment of the present invention is operable.

FIG. 1 illustrates a multi-network communication system, shown generally at 10, of which an embodiment of the present invention forms a portion. The exemplary communication system 10 includes a macrocellular network portion 12 and a microcellular network portion 14.

The macrocellular network portion 12 includes a plurality of fixed-site base stations 16 positioned at spaced-apart locations throughout a geographical area. In the illustrated embodiment, each of the base stations 16 defines a cell 18, and groups of three base stations 16 are located together. Each of such co-located base stations 16 exhibits a coverage area which defines a separate cell 18. The base stations 16 typically include fixed-site transceivers which permit wireless communications to be effectuated with remotely-positioned mobile terminals, such as the mobile terminal 22 when the mobile terminal is positioned within communication range of respective ones of the base stations.

The cells 18 defined by the coverage areas of the base stations are hexagonal in shape for purposes of illustration. In an actual system, the communication range, i.e., coverage area, of a base station might differ with that shown in the figure. That is to say, the cells 18 may well be non-symmetrical with respect to the base station and the cells defined by different ones of the base stations might differ in shape from one another. Also, in an actual communication system, the coverage areas of different, such as adjacent, base stations might also overlap with one another.

Groups of the base stations 16 are coupled to base station controllers (BSCs) 24. Lines 26 couple the base stations to the BSCs 24. The BSCs 24 are coupled to mobile switching centers (MSCs), such as the MSC 27, by way of the lines 28. The MSCs, of which one MSC 27 is illustrated in the Figure, are coupled to a public switched telephone network (PSTN) 29.

The PSTN 29 is coupled, in turn, to other communication stations, of which a single, exemplary communication station 30 is illustrated in the figure. The communication station 30 may, for example, be formed of a wireline, telephonic device or other device, such as, e.g., a cordless terminal capable of transmission and reception of communication signals by way of the PSTN 29. The terminal might instead have a communication with another mobile terminal (not shown) not connected to the PSTN.

The microcellular network portion 14, indicated in block form in FIG. 1, defines a coverage area, here positioned within the coverage area encompassed by one of the cells 18 of the macrocellular network portion 12. Transceiver circuitry of the microcellular network portion 14 is also coupled, in one embodiment, to the MSC 27, here indicated by way of lines 32. The microcellular network portion 14 may, for example, be similar in structure to that which shall be described with respect to FIGS. 3, 4, or 5 below.

In another embodiment, and as indicated by the lines 32', shown in dash, the microcellular network portion is instead coupled to the PSTN 29 rather than to the MSC 27 to which the base stations 16 are coupled. The microcellular network portion 14 may, for example, be similar in structure to that which shall be described below with respect to FIGS. 3, 4, or 5. In one such embodiment, for example, the microcellular network portion 14 is formed in a manner analogous to the manner in which the macrocellular network portion 12 is formed, but over a smaller area.

The mobile terminal 22 is operable alternately to communicate with a communication station, of which the communication station 30 is exemplary, by way of the macrocellular network portion 12 and the microcellular network portion 14. As mentioned previously, when the mobile terminal is positioned in an area intended to be encompassed by the microcellular network portion 14, it is generally desired that the mobile terminal 22 communicate with another communication station by way of the microcellular network portion rather than the macrocellular network portion.

Analogously, when the mobile terminal is positioned beyond the area intended to be encompassed by the microcellular network portion, it is generally desired that the mobile terminal communicate by way of the macrocellular network portion 12.

As positioned in FIG. 1, when the mobile terminal 22 communicates with another communication station, here communication station 30, communications are effectuated by way of a base station 16 of the macrocellular network portion. As the mobile terminal 22 moves between cells 18 of the macrocellular network portion 12, if the mobile terminal is in the active mode, ongoing communications are handed-over between successive ones of the base stations 16. If the mobile terminal is in the idle mode, cell selection, such as that which occurs during registration procedures, is made.

In one embodiment, when the mobile terminal is in the active mode hand-overs are made responsive, in part, to mobile-assisted hand-off (MAHO) measurements made by the mobile terminal. When positioned in a cell, the mobile terminal periodically tunes to control channels associated with base stations defining cells which are neighbors to the cell in which mobile terminal is located. The mobile terminal is provided with indications of the control channels of the base stations associated with the "neighbor cells", thereby to permit the mobile terminal to tune to such channels.

Signal strength measurements are made by the mobile terminal of control signals generated by the base stations of the neighbor cells and also of control signals of the base station through which the mobile terminal is communicating, the "serving" base station. Indications of the results of such measurements are reported back to the base station through which the mobile terminal is communicating and, in turn, to the BSC 24. When the signal strengths of a control signal generated by a base station of a neighbor cell becomes stronger than that of the control signal generated by the serving base station, the BSC 24 or MSC 27 permits a cell selection, such as a hand-over is permitted to be effectuated.

During ongoing communications, when a hand-over is to be effectuated between the serving base station 16 and another base station controlled by the same BSC 24, the BSC controls the hand-over. For instance, the BSC 24 orders the other base station to activate a traffic channel. The BSC sends a message to the mobile terminal via the serving base station containing information regarding the new channel to which the mobile terminal should tune.

When a hand-over is to be effectuated between the serving base station 16 and another base station controlled by a separate BSC 24, the hand-over procedures are somewhat altered. If the serving BSC and the separate BSC are controlled by the same MSC 27, then the serving BSC sends a hand-over required message to the MSC together with the identity of the other base station. The MSC, in turn, sends a hand-over request to the appropriate BSC. And, such BSC orders the other base station to activate a traffic channel.

When a hand-over is to be effectuated between the serving base station 16 and another base station controlled by a BSC coupled to a separate MSC 27, the hand-over procedures are again somewhat altered. The serving BSC sends a hand-over required message to the serving MSC together with the identity of the other base station. The serving MSC informs the appropriate MSC, and the appropriate BSC is provided with a hand-over request. Then, the BSC orders the other base station to activate a traffic channel.

While analysis of the signal strength, or other signal quality, measurement is performed at the BSC 24 or MSC 27 in the just-mentioned embodiments, such analysis may, of course, be performed, in other embodiments, by other elements.

Taking into account the above-noted preferences, when the mobile terminal 22 enters the area intended to be encompassed by the microcellular network portion 14, it is desired that ongoing communications by way of a base station of the macrocellular network be handed-over from a base station of the macrocellular network portion 12 to circuitry of the microcellular network portion 14. Conversely, when the mobile terminal 22 is positioned in the area intended to be encompassed by the microcellular network portion 14 and exits such area, it is desired that the ongoing communications by way of the circuitry of the microcellular network be handed-over from the circuitry of the microcellular network portion 14 to a base station 16 of the macrocellular network portion 12.

In an embodiment in which MAHO measurements are made by the mobile terminal 22 and the mobile terminal enters an idle mode from an inactive state, cell selection is made at power on of the mobile terminal. The mobile terminal 22 makes measurements of control signals generated by base stations of the network portions in which the terminal 22 is operable. Determinations are made as to the signal strengths of signals generated by the base stations and of the availability of such base stations. While in the idle mode, cell re-selection measurements are additionally made at selected time intervals.

Figure 2:
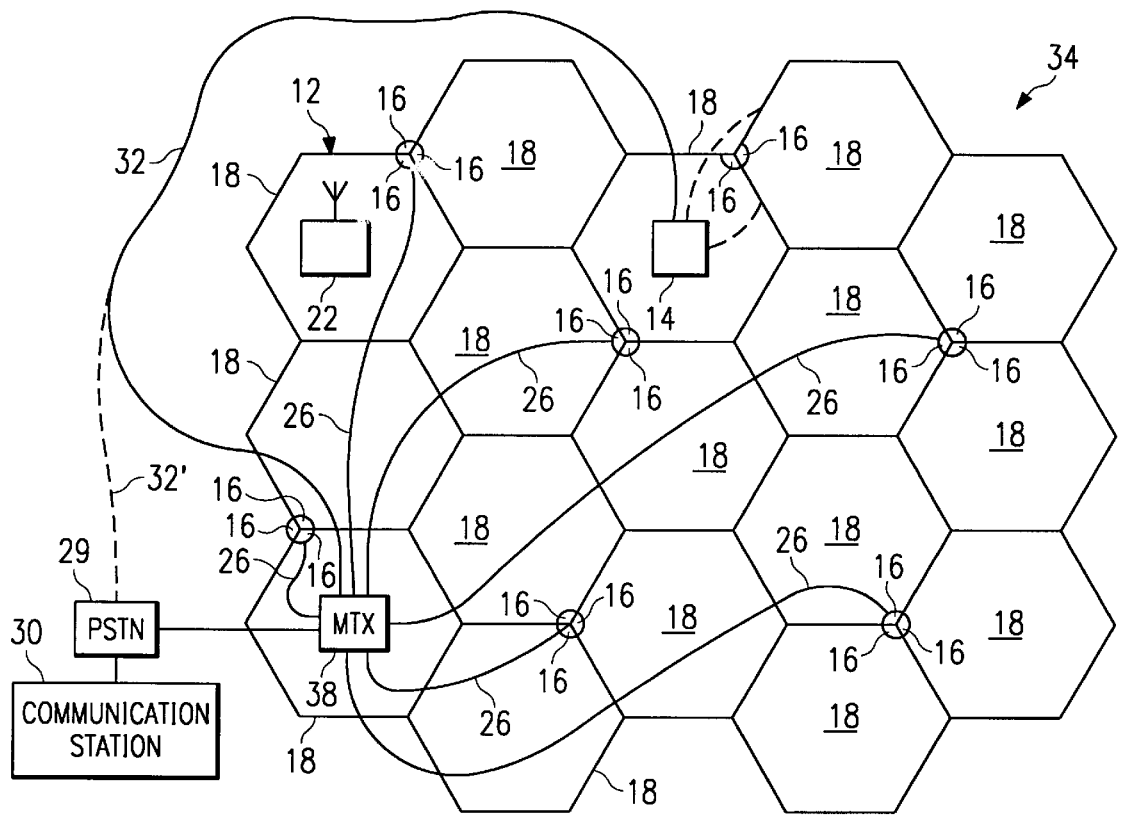
FIG. 2 illustrates a functional block diagram, similar to that shown in FIG. 1, but representative of another communication system also having a macrocellular network portion and a microcellular network portion in which an embodiment of the present invention is also operable.

FIG. 2 illustrates another exemplary multi-network communication system, shown generally at 34, of which an embodiment of the present invention also forms a portion. The exemplary communication system 34 is also formed of a microcellular network portion 14. Elements shown in FIG. 2 which correspond to elements shown previously in FIG. 1 are commonly-referenced. Description of the operation of such commonly-referenced elements can be found in the foregoing description of FIG. 1.

In the macrocellular network 12 shown in FIG. 2, groups of the base stations are coupled to MTXs 38, of which a single MTX 38 is illustrated in the Figure. The base stations 16 are coupled to the MTXs 38 by way of lines 26. And, the MTXs 38 are coupled to the PSTN 28.

The microcellular network portion 14 defines a coverage area, here positioned within the coverage area encompassed by one of the cells 18 of the macrocellular network portion 12. Transceiver circuitry of the microcellular network portion 14 is also coupled, in one embodiment, to the MTX 38, here indicated by way of lines 32. The microcellular network portion 14 may again, for example, be similar in structure to that which shall be described below with respect to FIGS. 3, 4, or 5.

In another embodiment, and as indicated by lines 32', shown in dash, the microcellular network is instead coupled to the PSTN 29 rather than to the MTX 38. In one such embodiment, for example, the microcellular network portion 14 is formed in a manner analogous to the manner in which the macrocellular network portion 12 shown in FIG. 2 is formed, but over a smaller area. In another such embodiment, for example, the microcellular network portion is formed in a manner analogous to the manner in which the macrocellular network portion 12 shown in FIG. 1 is formed, but over a smaller area.

The mobile terminal 22 is operable alternately to communicate with a communication station, such as communication station 30, by way of the macrocellular network portion 12 and the microcellular network portion 14. As positioned in FIG. 2, when the mobile terminal communicates with another communication station, here communication station 30, communications are effectuated by way of a base station 16 of the macrocellular network portion. As the mobile terminal 22 moves between cells 18 of the macrocellular network portion 12, communications are handed-over between successive ones of the base stations. When the mobile terminal is, instead, in the idle mode, other cell selection is sometimes made, as described previously with respect to FIG. 1.

In one embodiment, signal strength measurements of signals generated by the mobile terminal are made at different ones of the base stations, including the serving base station. Values indicative of such measurements are provided to the MTX. If the signal strength of a mobile-terminal-generated signal is detected at a base station other than the serving base station to be of a greater magnitude than the signal strength of the signal detected at the serving base station, the MTX permits a hand-over or other cell selection to be effectuated. Other manners by which to determine when to effectuate a cell selection, such as a hand-over are, of course, also possible.

Figure 3:
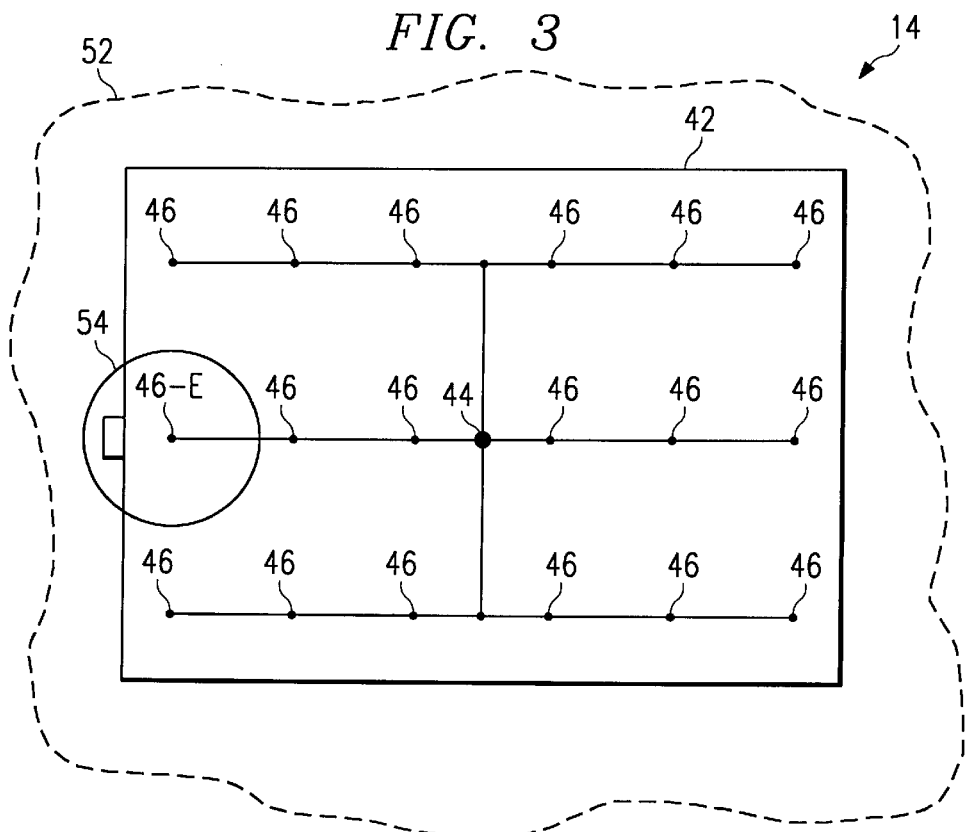
FIG. 3 illustrates a plan view of a building structure whose area is intended to be encompassed by the infrastructure of the microcellular network portion in which an embodiment of the present invention is operable.

FIG. 3 illustrates a building structure 42 intended to be encompassed by the microcellular network portion 14, shown in FIGS. 1 or 2. The microcellular network portion 14 is, in the exemplary embodiment of the Figure, here shown to be formed of a central control unit 44, sometimes referred to as a HUB, and remote antenna devices (RADs) 46 coupled thereto. The RADs 46 are distributed throughout the building structure 42. The circuitry of the network portion 14 of the embodiment illustrated in FIG. 3 is similar to that disclosed in the aforementioned, co-pending patent application, U.S. Ser. No. 08/540,326. Details of operation thereof are more fully explained in such disclosure. It should be noted that the structure of the embodiment shown in FIG. 3 is exemplary. The microcellular network 14 can instead be formed in other manners, including those shown in succeeding Figures.

In the embodiment shown in FIG. 3, the RADs 46 are distributed at spaced-intervals along interior hallways (not separately shown in the Figure) of the building structure 42. A mobile terminal 22 positioned anywhere within the building structure 42, such as in an office positioned at the periphery of the building structure 42, is thereby able to transmit and to receive communication signals with at least one of the RADs 46. The building structure 42 is, of course, exemplary. Other types of areas, whether indoor or outdoor, could similarly be encompassed by the microcellular network portion 14.

In one embodiment, the RADs 46 each include transmitting and receiving devices to transmit communication signals to, and to receive communication signals from, mobile terminals positioned within the coverage areas defined by the various RADs. The receiving devices of the RADs are wideband devices to receive uplink signals generated by the mobile terminals positioned at any location within the coverage area of the microcellular network portion. Downlink control signals are simulcast by each of the transmitting devices of the RADs, while downlink traffic signals are transmitted only by transmitting devices of the RADs in whose coverage areas the mobile terminal is determined to be located.

Determination of the location of the mobile terminal is made by the central control unit 44 by comparing the signal strengths of the uplink signal, as detected by the receiving devices of the various RADs. The RADs at which the strongest signal strengths are detected are thereby determined to be the RADs in whose coverage areas the mobile terminal is determined to be located. In one embodiment, the signal strengths detected by the RADs must further be of at least a minimum threshold value to permit the determination to be made that the mobile terminal is located in a coverage area of a particular RAD.

While the intended area to be encompassed by the microcellular network portion 14 is the interior area of the building structure 42, the actual coverage area 52 encompassed by the microcellular network portion 14 extends therebeyond. The coverage area 52 shown in the figure is exemplary and is dependent upon many factors including signal power levels and channel conditions of the channels upon which communications between the mobile terminal and the network portion are transmitted.

Because the actual area 52 encompassed by the microcellular network portion 14 extends beyond the interior of the building structure 42, an attempt might be made to hand-over ongoing communications of a mobile terminal positioned exterior to the building structure 42 from a base station 16 of the macrocellular network portion 12 (shown in FIGS. 1–2) to the microcellular network portion 14. When in the idle mode, an attempt to effectuate a cell re-selection might be made.

Additionally, while the intended area to be encompassed by the microcellular network portion 14 is the interior of the building structure 42, communications of a mobile terminal 22 with another communication station by way of a base station 16 of the macrocellular network portion is also possible. Particularly when positioned at a peripheral area of the building structure 42, the signal level of control signals generated by a base station 16 of the macrocellular network portion 12 might well be significant relative to the signal strength level of control signals generated by the RADs 46 of the microcellular network portion 14.

MAHO measurements made by the mobile terminal in manners as described previously with respect, e.g., to FIG. 1, might indicate that a cell selection, such as a hand-over when the mobile terminal is in the active mode or cell re-selection when the mobile terminal is in the idle mode, should be effectuated. In another embodiment, signal strength levels of mobile terminal-generated signals are measured at selected base stations, in manners as described previously with respect, e.g., to FIG. 2. Such measurements similarly might indicate that a hand-over or other cell selection should be effectuated. Therefore, even when a mobile terminal is positioned within the area intended to be encompassed by the microcellular network portion 14, an attempt to hand-over ongoing communications or make an other cell selection, contrary to system designers, desires, might be attempted.

An embodiment of the present invention is operable to control through which of the communication network portions the mobile terminal 22 is permitted to communicate by controlling when hand-over of ongoing communication between the two network portions is permitted and by controlling when cell selection of an idle-mode mobile terminal is permitted. Thereby, control over through which of the network portions that the mobile terminal communicates is better assured.

As shall be described below, the coverage area of a transceiver forming a portion of a network portion 12 or 14 defines a gateway area 54. The transceiver, here a RAD identified by 46-E, whose coverage area defines the gateway area is, for instance, positioned at an entranceway to the area intended to be encompassed by the microcellular network portion 14. Here, a gateway area 54 is defined at an entry-way, such as at a doorway to the building structure 42. Cell selection or other hand-over of communications between the macrocellular and microcellular network portions is permitted only when the mobile terminal is positioned at the gateway area. The gateway area forms a gateway, alternately from the microcellular network portion to the macrocellular network portion and from the macrocellular network portion to the microcellular network portion. Such positioning of the mobile terminal at the gateway area might be indicative, e.g., of movement of the mobile terminal into or out of the building structure. When positioned at the gateway area, it is therefore appropriate to permit possible hand-over of communications between network portions.

FIG. 4 again illustrates the building structure 42 intended to be encompassed by the microcellular network portion 14, shown in FIGS. 1 or 2. The microcellular network portion 14 is, in the exemplary embodiment of the Figure, here shown to be formed of a plurality of base stations (BTSs) 16. The base stations 16 are analogous to those shown to form portions of the macrocellular network portion 12 of FIG. 1, but here encompass much smaller cells 18.

The base stations 16 are analogously also coupled to BSCs 24. In one embodiment, the BSCs 24 of the microcellular network portion are coupled to the same MSCs 27 to which the base stations 16 of the macrocellular network portion are coupled. Lines 28 extending from the BSCs 24 are representative of such an embodiment. In another embodiment, the BSCs 24 are coupled by way of lines 28' to an MSC 27' which forms a portion only of the microcellular network portion 14. The MSC 27' is, in turn, coupled to the PSTN 29 (shown in FIGS. 1 and 2).

Determination of the location of the mobile terminal is made in manners analogous to those described previously with respect to FIG. 1 or in other manners, as appropriate.

Again, while the intended area to be encompassed by the microcellular network portion 14 is the interior area of the building structure 42, the actual coverage area 52 encompassed by the microcellular network portion 14 extends therebeyond in the exemplary illustration. The problems associated with an attempt to hand-over communications, as described in detail with respect to FIG. 3 above, again might be evident.

An embodiment of the present invention is operable to control through which of the communication network portions the mobile terminal 22 is permitted to communicate by controlling when hand-over of ongoing communication between the two network portions is permitted. Possible cell selection of an idle-mode mobile terminal is also controlled. Thereby, control over through which of the network portions that the mobile terminal communicates is better assured.

Again, a gateway area 54 is defined by a transceiver forming a portion of a network portion 12 or 14. In the illustrated embodiment of FIG. 4, the transceiver forms a base station, here a base station identified by 16-E, of the network portion 14. The gateway area forms a gateway, alternatively from the microcellular network portion to the macrocellular network portion and from the macrocellular network portion to the microcellular network portion.

While not separately shown, the microcellular network portion can also be formed of structure analogous to that which forms the macrocellular network portion 12 of FIG. 2.

FIG. 5 yet again illustrates the building structure 42 intended to be encompassed by the microcellular network portion 14, shown in FIGS. 1 and 2. The microcellular network portion 14 is, in the exemplary embodiment of the Figure, here shown to be formed of at least a first base station 16 to which an antenna device having distributed antenna elements 56 are coupled and a second base station 16. The first base station defines a first cell 18 and the second base station 16 defines a second cell 18.

The base stations 16 are coupled to a BSC 24 by way of lines 26. In one embodiment, the BSC 24, is, in turn, coupled to an MSC 27 of the macrocellular network portion by way of line 28. In another embodiment, the BSC 24 is coupled to an MSC 27' of the microcellular network portion by way of line 28'.

Determination of the location of the mobile terminal is made in manners analogous to those described previously with respect to FIG. 1, FIG. 2, or in other manners, as appropriate.

Again, while the intended area to be encompassed by the microcellular network portion 14 is the interior area of the building structure 42, the actual coverage area 52 encompassed by the microcellular network portion 14 extends therebeyond in the exemplary illustration. The problems associated with an attempt to hand-over ongoing communications or to make other cell selections for an idle-mode, mobile terminal, as described in detail with respect to FIG. 3 above, again might be evident.

An embodiment of the present invention is operable to control through which of the communication network portions the mobile terminal 22 is permitted to communicate by controlling when hand-over of ongoing communication between the two network portions is permitted. Possible cell selection of an idle-mode, mobile terminal is also controlled. Thereby, control over through which of the network portions that the mobile terminal communicates is better assured.

Exemplary operation of the following embodiments of the present invention shall be described with respect to an active-mode, mobile terminal. Operation of an embodiment of the present invention to an idle mode terminal can analogously be described.

Again, a gateway area 54 is defined by a transceiver forming a portion of a network portion 12 or 14. The gateway area forms a gateway, alternatively from the microcellular network portion to the macrocellular network portion and from the macrocellular network portion to the microcellular network portion. Here, the gateway is formed by the coverage area of the second base station here shown at 16-E.

FIG. 6 again illustrates the microcellular network portion 14 installed at a building structure 42. Analogous to the embodiment shown in FIG. 3, the portion 14 is again formed of a central control unit 44 and a series of distributed, remote antenna devices (RADs) 46 positioned about the interior of the building structure 42. A mobile terminal 22 is also illustrated in the figure in several positions to indicate the location of the mobile terminal at several instances in time, indicated by time $t_0$, $t_1$, $t_2$, $t_3$, and $t_4$. The gateway area 54 is defined by the coverage area of a RAD 46-E positioned proximate to an entryway to the building structure 42. In the following description of an exemplary embodiment, the mobile terminal 22 is operable to make MAHO measurements. It should be understood that, in other embodiments, other measurements are instead made and utilized to determine the position of the mobile terminal.

At time $t_0$, the mobile terminal 22 is positioned at a location at which communications with another communication station, such as the communication station 30 shown in FIGS. 1 and 2, is possible only by way of a base station 16 of the macrocellular network portion 12. Communications originating at, or terminating at, the mobile terminal 22 at time $t_0$ are effectuated by way of the base station 16, in conventional manner. For purposes of simplicity, only a single base station of a macrocellular network is shown.

During operation of the mobile terminal while positioned at the location indicated at time $t_0$, MAHO measurements are performed by the mobile terminal, as described previously. When positioned as indicated at time $t_0$, the MAHO measurements do not indicate that a hand-over should be made to the microcellular network portion.

At time $t_1$, the mobile terminal 22 is again positioned exterior to the building structure 42, i.e., beyond the intended area to be encompassed by the microcellular network portion 14, but within the actual area 52 encompassed by the microcellular network portion 14. At such a position, signal strength, e.g., MAHO, or other, measurements might indicate that a hand-over of communications from the macrocellular network portion to the microcellular network portion should be made. For instance, when the mobile terminal is operable to make MAHO measurements, a signal generated by the RAD 46 positioned in the upper, left-side (as shown) portion of the building structure 42 might be of a greater signal strength than the signal strength of a signal generated by a serving base station 16. In an embodiment of the present invention, such possible hand-over to the microcellular network portion 14 is prohibited until the mobile terminal 22 is positioned at the gateway area 54. That is to say, possible hand-over of communications from the macrocellular network portion to the microcellular network portion is prohibited from being effectuated to any of the RADs 46 but for the RAD 46-E positioned at the gateway area.

At time $t_2$, the mobile terminal is positioned at the gateway area 54. MAHO measurements taken by the mobile terminal 22 indicate that signal strengths of signals generated by the RAD 46-E whose coverage area defines the gateway area 54 are greater than the signal strengths of signals generated by the base station through which the mobile terminal is communicating. When the RAD 46-E positioned at the gateway area detects the presence of the mobile terminal thereat, such detection made in manners as described above with respect to FIG. 2, hand-over of communications from a base station 16 of the macrocellular network portion is permitted. Again, additional details related to the manner by which a determination is made at the control circuitry 44 of positioning of a mobile terminal, such as the mobile terminal 22, proximate to a RAD 46 can also be found in the aforementioned, co-pending U.S. patent application Ser. No. 08/540,326, the contents of which are incorporated herein.

A single gateway area 54 is defined at the entranceway to the building structure 42 for purposes of illustration. If the building structure includes more than one entranceway, for instance, separate entranceways located at separate locations of the building, separate gateway areas can be defined. Thereby more than one gateway is formed.

Possible hand-over of communications when the mobile terminal is positioned at one of the gateway areas, such as when the mobile terminal enters and exits the building structure 42 by way of any of the entranceways is permitted. Possible hand-over of communications is prohibited but for when determinations are made that the mobile terminal is possibly entering or exiting the intended area to be encompassed by the microcellular network portion. Communication by the mobile terminal 22 with another communication station only by way of the microcellular network portion only when the mobile terminal is positioned in the intended area to be encompassed by the microcellular network portion is better assured.

Conversely, if the mobile terminal 22 is positioned within the building structure 42 and is communicating by way of the microcellular network portion with another communication station (not shown), possible hand-over of communications from the microcellular network portion to the macrocellular network portion is permitted only when the mobile terminal is positioned at the gateway area 54.

Figure 6:
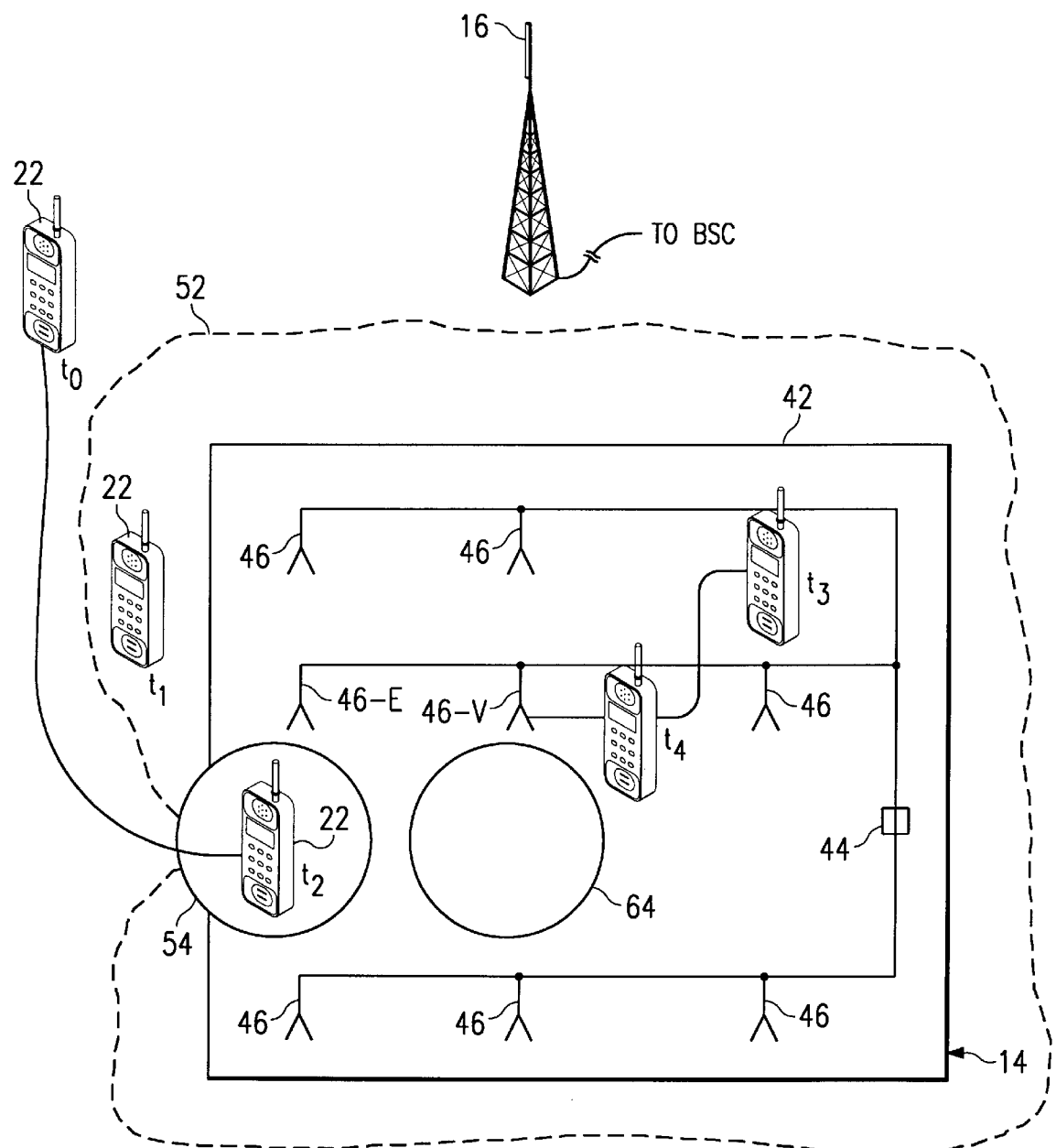
FIG. 6 illustrates a functional block diagram of a portion of the communication system shown in FIGS. 1 or 2 in which an embodiment of the present invention is operable to control communication by a mobile terminal with a selected one of the microcellular network portion and macrocellular network portion of the communication system.

FIG. 6 also illustrates positioning of the mobile terminal 22 at two locations within the building structure 42, at times $t_3$ and $t_4$. As mentioned previously, the coverage area of the macrocellular network portion extends into the interior of the building structure 42. Ongoing communications can not be handed-over between the microcellular network portion and the macrocellular network portion unless the mobile terminal is positioned at a gateway area. But, if the mobile terminal is in an inactive state and is turned on, particularly when the mobile terminal is positioned at the periphery of the building structure 42, the mobile terminal might be admitted to communicate by way of a base station 16 of the macrocellular network portion rather than the microcellular network portion. In other embodiments the position of the mobile terminal is made in other manners.

Additional gateway areas, of which one additional gateway area 64 is illustrated in the figure, are also defined. Use of such areas 64 permit hand-over of such communications from the macrocellular network portion to the microcellular network portion without requiring the mobile terminal to be positioned at a gateway area 54. Such gateway areas are again defined by the coverage areas of selected RADs 46, here RAD 46-V. The gateways between network portions formed at the gateway areas 64 can be considered to be virtual, or pseudo-, gateways between the network portions. Possible hand-over of communications from the macrocellular network portion to the microcellular network portion are permitted when the mobile terminal is positioned at a virtual gateway area 64.

At time $t_3$, the mobile terminal 22 is positioned at the periphery of the building structure 42. At the indicated position, when the mobile terminal is turned-on, MAHO measurements taken by the mobile terminal indicate that the mobile terminal should communicate with another communication station (not shown) by way of a base station 16 of the macrocellular network portion. As the mobile terminal is positioned within the area intended to be encompassed by the microcellular network portion, advantage is not taken of the cost and other benefits of utilization of the microcellular network portion.

As the mobile terminal 22 is repositioned at time $t_4$ in the interior of the building structure 42, MAHO measurements taken by the mobile terminal indicate that the signal strength of the control signals generated by the base station 16 of the macrocellular network portion become relatively smaller contrasted to signal strengths of control signals generated by the control circuitry 44 of the microcellular network portion 14. By defining the additional gateway areas 64 at interior portions of the building structure 42, hand-over of communications to the microcellular network portion is permitted. Use of a virtual gateway thereby corrects for an erroneous, initial selection of network portions through which to communicate.

Figure 7:
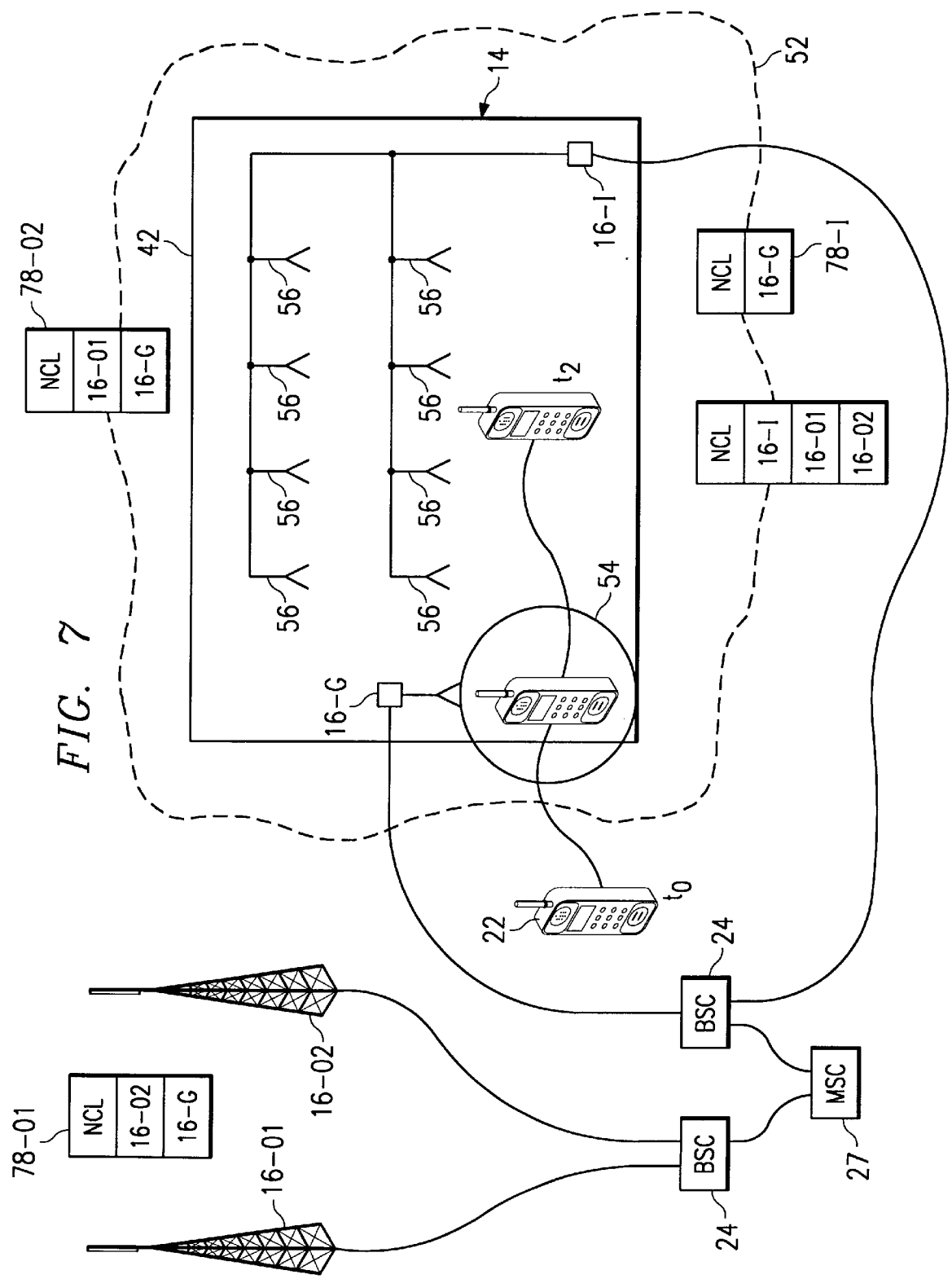
FIG. 7 illustrates a functional block diagram of a portion of the communication system shown in FIGS. 1 or 2 in which another embodiment of the present invention, also is operable to control communication of a mobile terminal with a selected one of the microcellular network portion and macrocellular network portion of the communication system.

FIG. 7 illustrates a communication system of an embodiment of the present invention. In this embodiment, the microcellular network portion 14 is similar to one of the embodiments shown in FIG. 5. And, for purposes of illustration, portions of the macrocellular network portion 12 shown previously in FIG. 1 is again shown.

Here, the first base station designated by 16-I (indicative of the typical Indoor nature of the microcellular network portion), is again shown to be coupled to a series of distributed antenna devices 56. The antenna devices are distributed about the building structure 42 to be positioned at spaced-apart locations thereabout. When a mobile terminal 22 is positioned within the building structure 42, i.e., the area intended to be encompassed by the microcellular network portion 14, the mobile terminal communicates with another communication station (not shown) by way of the base station 16-I to which the antennas 56 are coupled. Again, in the exemplary embodiment, the mobile terminal 22 is operable to make MAHO measurements. In other embodiments, the position of the mobile terminal is made in other manners.

The second base station, the gateway base station, is here designated by 16-G. The base station 16-G is positioned proximate to an entry to the building structure 42. The coverage area of the gateway base station forms a gateway cell which define the gateway between the network portions.

The base stations 16-I and 16-G are here coupled to a BSC 24 which forms a portion of the microcellular network portion. And the BSC 24 is here coupled to an MSC 29 of the macrocellular network portion.

Additional base stations, here base stations 16-01 and 16-02 (indicative of the typical Outdoor nature of the macrocellular network portion), form base stations of the macrocellular network portion and are operable in manners as described previously. The cell defined by the base station 16-01 overlaps with the area intended to be encompassed by the microcellular network portion 14. And, the cell defined by the base station 16-02 is adjacent to the cell defined by the base station 16-01.

A neighbor cell list is associated with each of the base stations 16 of both network portions. The neighbor cell list identifies neighbor cells, that is to say, base stations which define neighbor cells, to which communications by a mobile terminal 22 positioned in a cell are permitted to be handed-over. Indications of such lists are provided to a mobile terminal as part of control information transmitted by a base station to the mobile terminal. A mobile terminal utilizes the indications of the neighbor cell lists provided thereto in order to make signal strength measurements, such as mobile-assisted, hand-off (MAHO) measurements, described previously, of signals transmitted by base stations identified by the neighbor cell list.

Appropriate designation of permissible neighbor cells in the neighbor cell lists associated with each of the base stations provides a manner by which to control better communication by a mobile terminal 22 with a selected one of the network portions of the communication system 10.

For purposes of illustration, in FIG. 7, neighbor cell lists associated with the various base stations are illustrated proximate to the respective ones of the base stations.

The neighbor cell lists designate neighbor cells in manners which limit hand-over of communications between the macrocellular network portion 12 and the microcellular network portion 14. Hand-over of communications between the base stations of the microcellular network portion 14 and the macrocellular network portion 12 are permitted only through the gateway base station 16-G.

The neighbor cell list 78-G associated with the gateway base station 16-G includes the identity of the base stations 16-I of the microcellular network portion and the identities of the base stations 16-01 and 16-02 of the macrocellular network portion. When a mobile terminal is positioned in the gateway cell defined by the coverage area of the gateway base station 16-G, the mobile terminal takes MAHO, or other signal quality, measurements of control signals generated by the base stations 16-I, 16-01 and 16-02 (and additionally with the base station 16-G). Possible hand-over of communications are permitted to any of such base stations, responsive to such measurements, again in manners similar to those described previously. Possible hand-over of communications to other base stations is prohibited as the other base stations do not appear on the neighbor cell list provided to the mobile terminal. Again, in the exemplary embodiment, the mobile terminal 22 is operable to make MAHO measurements. In other embodiments, the position of the terminal 22 is determined by taking other types of measurements.

The neighbor cell list 78-I associated with the base station 16-I designates the base station 16-G. When the mobile terminal is positioned within the building structure 42, the mobile terminal is provided with such a neighbor cell list. The mobile terminal is permitted to make MAHO measurements of control signals generated by the gateway base station 16-G (and also with the base station 16-I). Possible hand-over of communications is permitted only to the gateway base station 16-G. Possible hand-over of communications with other base stations of the macrocellular network is prohibited.

The neighbor cell list 78-01 associated with the base station 16-01 designates the gateway base station 16-G and the base station 16-02 of the macrocellular network portion, but not the base station 16-I. Other base stations of the macrocellular network portion might also be included in the neighbor cell list 78-01. When the mobile terminal 22 is positioned at a cell formed by the coverage area defined by the base station 16-01 of the macrocellular network portion, the mobile terminal is provided with such a neighbor cell list. The mobile terminal makes MAHO measurements of signals generated by the base station 16-02 of the macrocellular network portion and of signals generated by the gateway base station 16-G (and also of the base station 16-01). Because the base station 16-I of the microcellular network portion is not designated on the neighbor cell list associated with the base station 16-01 of the macrocellular network portion, possible hand-over of communications from the base station 16-02 of the macrocellular network portion to the microcellular network portion is prohibited.

All hand-overs of communication to the microcellular network portion are directed by way of the base station 16-G. The neighbor cell list 78-02 associated with the base station 16-02 designates the gateway base station 16-G and the base station 16-01 of the macrocellular network portion, but not the base station 16-I. Other base stations of the macrocellular network portion might also be included in the neighbor cell list 78-02.

When the mobile terminal 22 is positioned at a cell formed by the coverage area defined by the base station 16-02 of the macrocellular network portion, the mobile terminal makes MAHO measurements of signals generated by the base station 16-01 of the macrocellular network portion and of signals generated by the gateway base station 16-G. Because the base station 16-I of the microcellular network portion is not designated on the neighbor cell list associated with the base station 16-02, possible hand-over of communications from the base station 16-02 to the microcellular network portion is prohibited.

Communication by a mobile terminal with the microcellular network portion when the mobile terminal is positioned in the area intended to be encompassed by the microcellular network portion is better assured. Again, if more than one entranceway into the building structure 42 is permitted, additional gateway areas formed of gateway cells defined by the coverage areas of additional gateway base stations can be created, additionally to permit hand-over of communications to such gateway base stations in manners analogous to those permitted by way of the base station 16-G.

FIG. 7 also illustrates the mobile terminal position at different locations at different times, times $t_0$, $t_1$, and $t_2$. At time $t_0$, the mobile terminal 22 communicates by way of the base station 16-01 of the macrocellular network portion. Signal quality measurements, such as mobile assisted hand-off (MAHO) measurements, are made by the mobile terminal with signals generated by the base station 16-02 of the macrocellular network portion and with signals generated by the gateway base station 16-G. Possible hand-over of communication requests responsive to such measurements to the base stations 16-02 or 16-G are made. As the base station 16-I is not designated on the neighbor cell list of the base station 16-01, possible hand-over of communication to the base station 16-I is prohibited.

At time $t_1$, the mobile terminal 22 is positioned within the gateway cell defined by the gateway base station 16-G. MAHO, or other signal quality, measurements are made by the mobile terminal with control signals generated by base stations of both the microcellular portion, here base station 16-I, and base stations of the macrocellular network portion (and also with the base station 16-G), here, base stations 16-01 and 16-02. Measurements are also permitted to be made of signals generated by the base station 16-G. Responsive thereto, possible hand-over of communication to the base stations 16-I, 16-01, and 16-02 is permitted. The gateway area 54 thereby forms a gateway between the network portions. And, at time $t_2$, the mobile terminal is permitted to make MAHO, or other signal quality, measurements of only the gateway base station 16-G. Possible hand-over of communication to the base station 16-I is permitted, while possible hand-over of communication with the base stations of the macrocellular network is prohibited.

Figure 4:
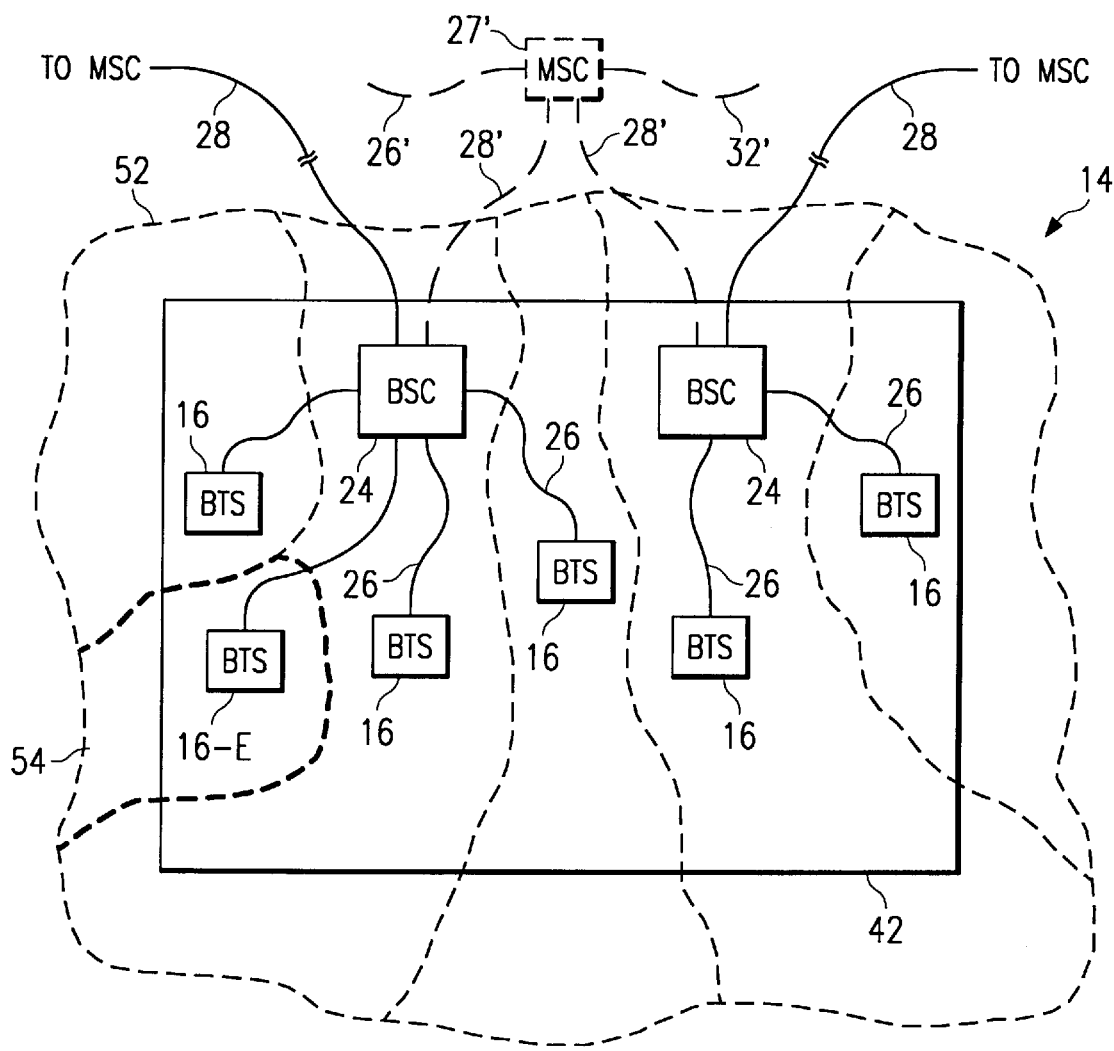
FIG. 4 illustrates a plan view, similar to that shown in FIG. 3, but which illustrates infrastructure of a microcellular network portion in which another embodiment of the present invention is operable.
Figure 5:
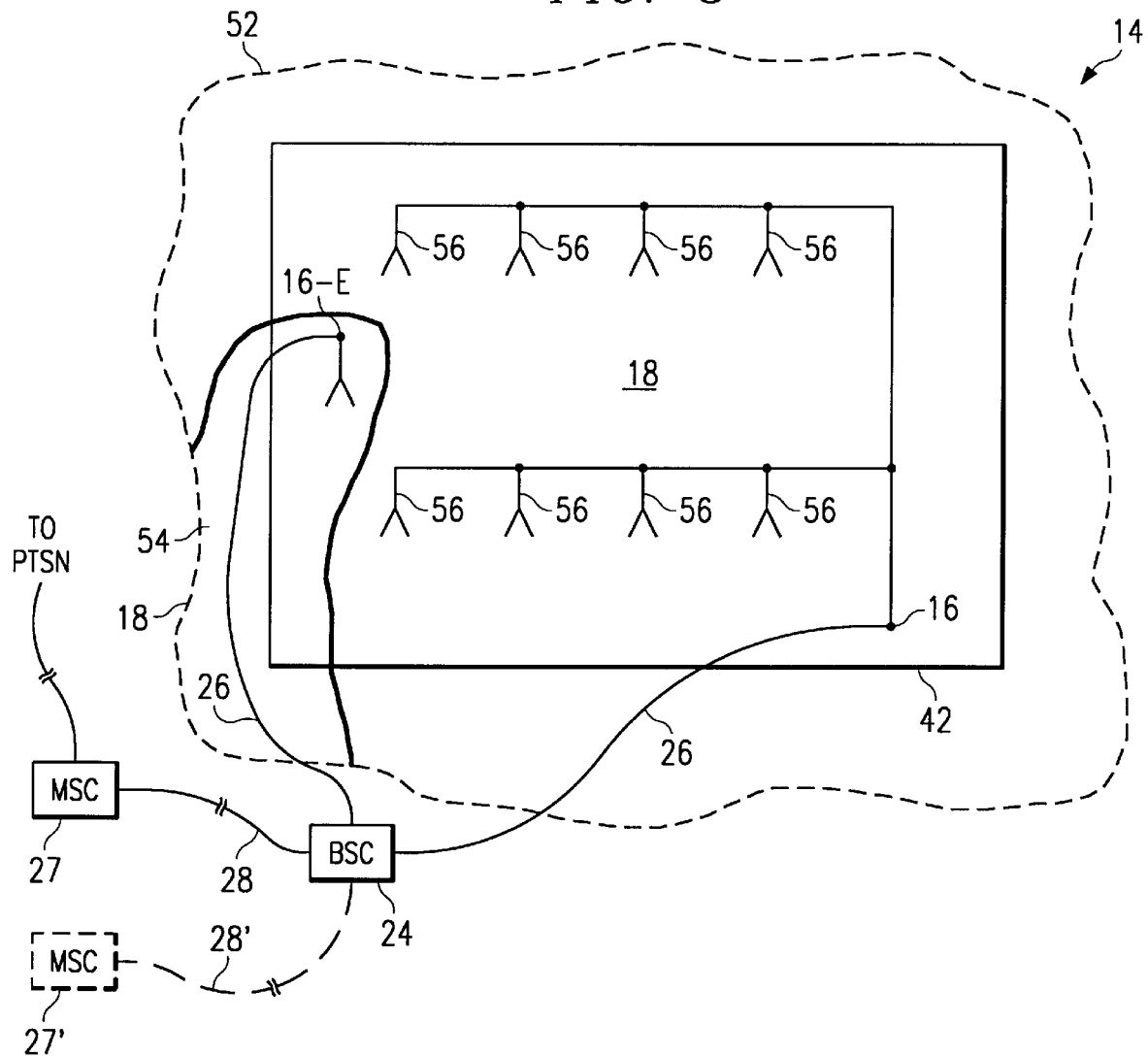
FIG. 5 illustrates a plan view, similar to those shown in FIGS. 4–5, but which illustrates infrastructure of a microcellular network portion in which another embodiment of the present invention is operable.

While not separately shown, operation of an embodiment of the present invention in which the microcellular network portion is formed of the structure shown in FIG. 4 is analogous to that of the operation described with respect to the embodiment shown in FIG. 7. That is to say, neighbor cell lists are defined for the base stations of the network portions 12 and 14 in manners to control hand-overs of communication. By properly defining the neighbor cell lists, possible hand-over of communications between the network portions is permitted only when the mobile terminal is positioned at the gateway defined between the network portions.

Figure 8:
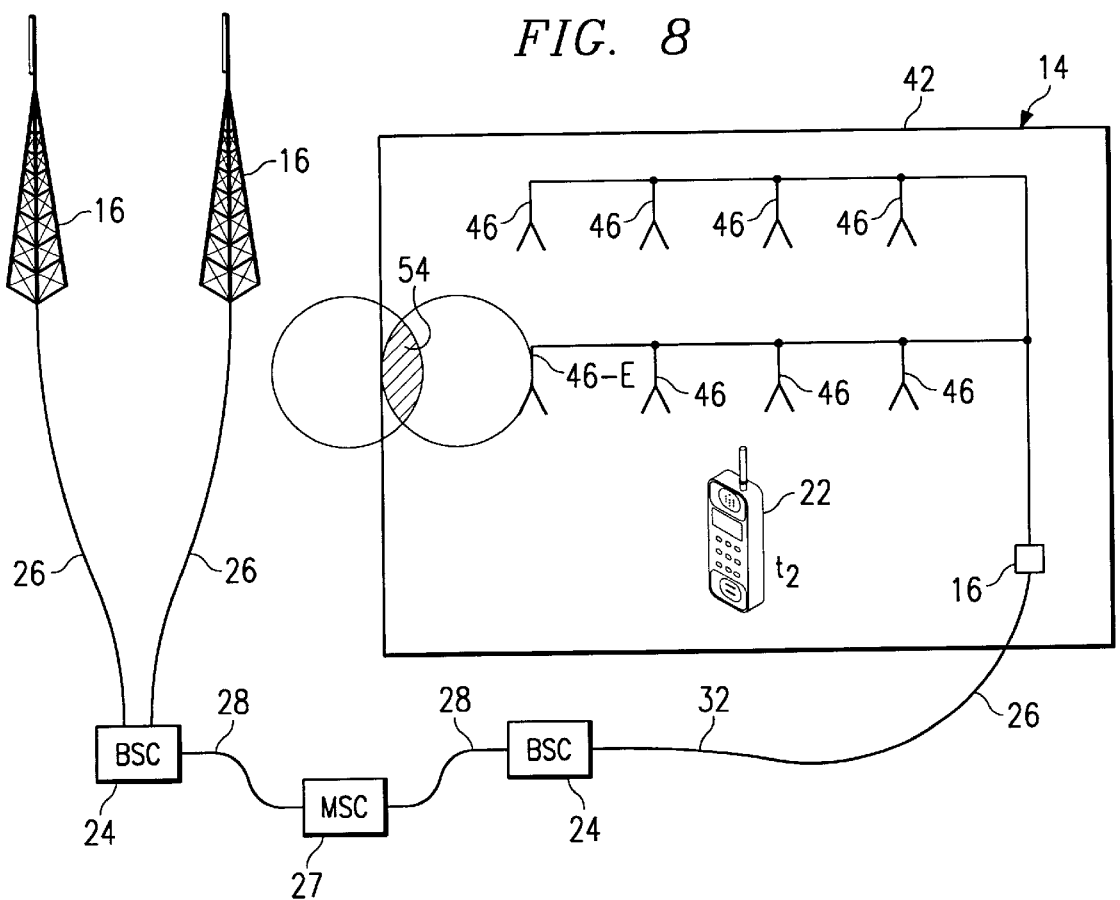
FIG. 8 illustrates a functional block diagram similar to that shown in FIG. 7 but of another embodiment of the present invention.

FIG. 8 illustrates another embodiment of the present invention. Structure shown and described previously are commonly-referenced in the figure. Description of operation of such commonly-referenced structure can be found in the foregoing description and shall not again be described.

The embodiment shown in FIG. 8 illustrates another manner by which the gateway area 54 can be formed. Here the gateway area is formed at the overlapping coverage areas of two separate transceivers of the two separate network portions. The coverage areas of the two separate transceivers partially overlap with one another. The partially-overlapping areas are indicated by the area shown in-dash.

MAHO, or other, measurements are made and compared. A mobile terminal is determined to be positioned at the gateway area if, e.g., the signal strength measurements are at least as great as selected thresholds with respect to both network portions. Once determined to be at the gateway area, possible hand-over of communications between network portions is permitted. In the illustrated embodiment, hand-over operations are handled in manners analogous to those described with respect to the embodiment shown in FIGS. 5 and 7. While not separately shown, a system can alternately be constructed in a manner analogous to that shown in others of the Figures.

Figure 9:
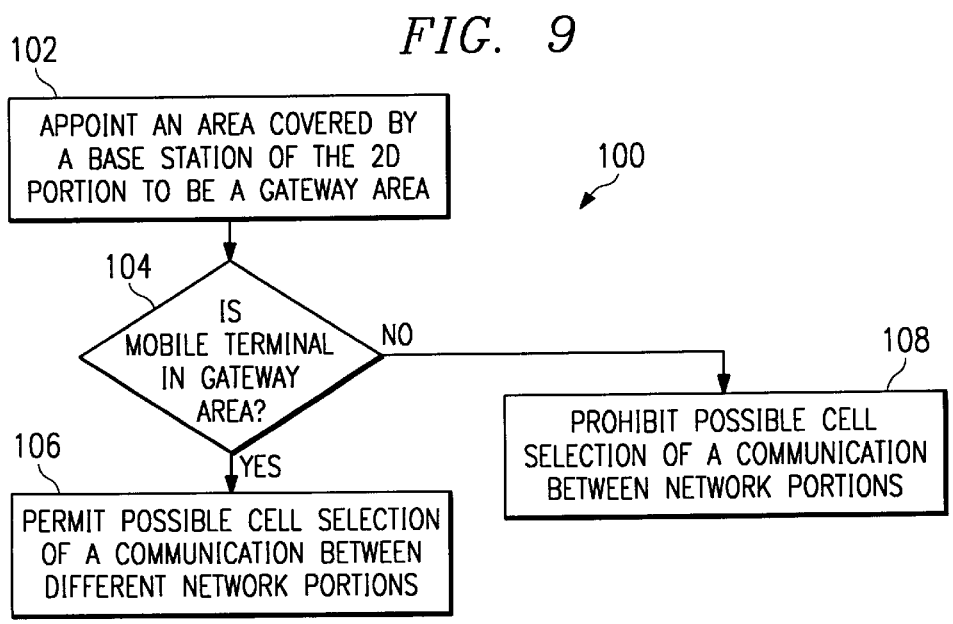
FIG. 9 illustrates a logical flow diagram listing the method steps of an embodiment of the present invention.

FIG. 9 illustrates a method, shown generally at 100, of an embodiment of the present invention. The method 100 selectively permits and prohibits possible cell selection of a communication with a mobile terminal between a first wireless network portion and a second wireless network portion. The wireless network portions each include at least one base station transceiver. First, and as indicated by block 102, an area covered by at least one base station transceiver of the second wireless network portion is appointed to be a gateway area. Then, and as indicated by the decision block 104, a determination is made whether the mobile terminal is located within the gateway area. If so, the yes branch is taken to block 106, and possible cell selection of communication with the mobile terminal between the first wireless network portion and the second wireless network portion is permitted.

Otherwise, the no branch is taken to block 108 and possible cell selection of communication with the mobile terminal between the first wireless network portion and the second wireless network portion is prohibited.

In one embodiment, the determination made at decision block 104 is made by transmitting radio signals from the mobile terminal, receiving at least two separate locations in at least one of the first and second network portions radio signals transmitted from the mobile terminal, and comparing at least one characteristic of the signals received at the at least two separate locations.

In another embodiment, the determination made at decision block 104 is made by transmitting radio signals from at least two separate locations in at least one of the first and second network portions, receiving at the mobile terminal radio signals transmitted from the at least two separate locations, and comparing the at least one characteristic of the signals received by the mobile terminal. In one embodiment, the characteristic of the signals form signal strengths. In other embodiments, other characteristics can be measured.

Operation of a communication system embodying the present invention selectively permits hand-over of ongoing communications by a mobile terminal between first and second network portions of the system. Hand-over of communications is permitted only when the mobile terminal is positioned at a defined gateway area. Possible cell selection of an idle-mode mobile is similarly selectively permitted. The gateway area is defined at a gateway positioned between intended areas of coverage of the two network portions. Control of with which of the communication network portions the mobile terminal is permitted to communicate is better assured. Better advantage is thereby made of the various features of the separate network portions.

The previous descriptions are preferred examples for implementing the invention, and the scope of the invention should not necessarily be limited by this description. The scope of the present invention is defined by the following claims.

What is claimed is:

1. A method of selectively permitting and prohibiting cell selection of a communication with a mobile terminal between a first wireless network and a second wireless network each network comprising at least one base station transceiver, said method comprising the steps of:

appointing an area covered by one base station transceiver of one network as a gateway area between the first and second networks;

determining whether or not the mobile terminal is located within the gateway area;

permitting cell selection of the communication with the mobile terminal between a cell within the first wireless network and a cell within the second wireless network when the mobile is within the gateway area; and prohibiting cell selection of the communication with the mobile terminal between a cell within the first wireless network and a cell within the second wireless network when the mobile terminal is outside the gateway area.

2. A method according to claim 1 wherein said step of determining comprises the steps of:

transmitting radio signals from the mobile terminal;

receiving by at least two base transceivers in at least one of the first and second networks, said radio signals transmitted from the mobile terminal; and comparing at least one characteristic of the signals received by the at least two base transceivers.

3. A method according to claim 2 for cellular network portions comprising cells determined by the base transceivers, wherein as gateway area is appointed an area comprising at least part of one cell but not all cells.

4. A method according to claim 3 wherein the step of permitting comprises:

arranging neighbor cell lists;

permitting a first cell of one network constituting at least part of the gateway area to appear on a neighbor cell list of a second cell of the other network; and permitting cell selection between the second cell and the first cell appearing on the neighbor cell list of the second cell.

5. A method according to claim 4 wherein the step of prohibiting comprises:

prohibiting a third cell of one network not constituting part of the gateway area to appear on the neighbor cell list of the second cell of the other network; and prohibiting cell selection between the second cell and the third cell not appearing on the neighbor cell list of the second cell.

6. A method according to claim 1 wherein said step of determining comprises the steps of:

transmitting radio signals from at least two base transceivers in at least one of the first and second networks;

receiving at the mobile terminal the radio signals transmitted from said at least two base transceivers; and comparing at least one characteristic of the signals received by the mobile terminal.

7. A method according to claim 6 for cellular network portions comprising cells determined by the base transceivers, wherein as gateway area is appointed an area comprising at least part of one cell but not all cells.

8. A method according to claim 7 wherein the step of permitting comprises:

arranging neighbor cell lists;

permitting a first cell of one network constituting at least part of the gateway area to appear on a neighbor cell list of a second cell of the other network; and permitting handover from the second cell to the first cell appearing on the neighbor cell list of the second cell.

9. A method according to claim 8 wherein the step of prohibiting comprises:

prohibiting a third cell of one network not constituting part of the gateway area to appear on the neighbor cell list of the second cell of the other network; and prohibiting handover from the second cell to the third cell not appearing on the neighbor cell list of the second cell.

10. A method according to claim 1 wherein the second wireless network comprises at least two cells within the second area, wherein the gateway area appointed during said step of appointing is formed of one of the cells of the second wireless network, wherein said method comprises the further step of:

arranging neighbor cell lists for the cells of the second network wherein only cells of the second network are permitted on the neighbor cell lists of the second network cells outside the gateway area;

wherein a handover of said communication from a given one of the second network cells to a cell appearing on the neighbor cell list of the given second network cell is permitted; and wherein a handover of said communication from the given one of the second network cells to a cell not appearing on the neighbor cell list of the given cell is prohibited.

11. A method according to claim 10 wherein the first wireless network portion comprises a cell within the first area, and wherein:

the first network cell is permitted to appear on the neighbor cell list of a second network cell within the gateway area;

a neighbor cell list is arranged for the cell of the first network;

the second network cell within the gateway area is permitted to appear on the neighbor cell list of the first network cell;

a second network cell outside the gateway area is prohibited to appear on the neighbor cell list of the first network cell;

wherein a handover of said communication from the first network cell to a cell appearing on its neighbor cell list is permitted; and wherein a handover of said communication from the first network cell to a cell not appearing on its neighbor cell list is prohibited.

12. A method according to claim 1 for a second wireless network having as base transceivers at least two antennas connected to a hub, wherein a possible location of the mobile terminal within the second area is determined by receiving signals from the mobile terminal by the antennas, and comparing the signals received by different antennas at the hub.

13. A method of selectively permitting and prohibiting a handover of a communication with a mobile terminal between a first wireless network and a second wireless network, each network comprising at least one base station transceiver, said method comprising the steps of:

appointing one base station transceiver of one network as a gateway transceiver between the first and second networks;

determining whether or not the mobile terminal is located within an area covered by said gateway transceiver;

permitting said handover of said communication with the mobile terminal between a cell within the first wireless network and a cell within the second wireless network when the mobile is within the area covered by said gateway transceiver; and prohibiting said handover of said communication with the mobile terminal between a cell within the first wireless network and a cell within the second wireless network when the mobile terminal is outside the area covered by said gateway transceiver.

14. A method according to claim 13 wherein said step of determining comprises the steps of:

transmitting radio signals from the mobile terminal;

receiving by at least two base transceivers at least one of which is said gateway transceiver radio signals transmitted from the mobile terminal; and comparing at least one characteristic of the signals received by the at least two base transceivers.

15. A method according to claim 14 wherein said permitting is done by permitting said handover from said gateway transceiver of one network and allowing handover from a base transceiver of one network to said gateway transceiver of the other network.

16. A method according to claim 15 wherein said prohibiting is done by prohibiting said handover from a non-gateway base transceiver of one network to a non-gateway base transceiver of the other network.

17. A method according to claim 13 wherein said step of determining comprises the steps of:

transmitting radio signals from at least two base transceivers at least one of which is said appointed gateway transceiver;

receiving at the mobile terminal radio signals transmitted from said at least two base transceivers; and comparing at least one characteristic of the signals received by the mobile terminal.

18. A method according to claim 17 wherein said permitting is done by permitting said handover from said gateway transceiver of one network to a base transceiver of the other network and allowing said handover from a base transceiver of one network to said gateway transceiver of the other network.

19. A method according to claim 18 wherein said prohibiting is done by prohibiting said handover from a non-gateway base transceiver of one network to a non-gateway base transceiver of the other network.

20. In a method for communicating in a communication system having a first wireless network permitting a mobile terminal to communicate therewith when positioned in a first area, the first area intended to be encompassed by the first wireless network and a second wireless network permitting the mobile terminal to communicate therewith when positioned in a second area, the second area intended to be encompassed by the second wireless network, an improvement of a method for selectively permitting cell selection of a communication with the mobile terminal between the first and second wireless networks, respectively, each network comprising at least one base station transceiver, said method comprising the steps of:

detecting when the mobile terminal is positioned at a selected gateway area, the selected gateway area defining a gateway between the first wireless network and the second wireless network, the selected gateway area being an area covered by one base station transceiver of one network;

generating a signal indicative of detection during said step of detecting the position of the mobile terminal at the selected gateway area;

permitting the cell selection of the communication with the mobile terminal between a cell within the first wireless network and a cell within the second wireless network when the signal indicative of the position of the mobile terminal at the gateway area is generated during said step of generating; and, otherwise prohibiting the cell selection of the communication with the mobile terminal between a cell within the first wireless network and a cell within the second wireless network.

21. In a communication system having a first wireless network permitting a mobile terminal to communicate therewith when positioned in a first area having at least one cell, the first area intended to be encompassed by the first wireless network and a second wireless network permitting the mobile terminal to communicate therewith when positioned in a second area having at least one cell, the second area intended to be encompassed by the second wireless network, and improvement of apparatus for selectively permitting cell selection of a communication with the mobile terminal between the first and second wireless networks, respectively, each network comprising at least one base station transceiver, said apparatus comprising:

at least one detector for detecting when the mobile terminal is positioned at a selected gateway area, the selected gateway area defining a selected gateway between the first wireless network and the second wireless network, the gateway area being an area covered by one base station transceiver of one network, said at least one detector further for generating a signal indicative of detection of the position of the mobile terminal at the selected gateway area; and a controller coupled to receive the signal indicative of the position of the mobile terminal at the gateway area, said controller for permitting the cell selection between a cell within the first wireless network and a cell within the second wireless network when the signal indicative of the position of the mobile terminal at the gateway area is received thereat and for prohibiting the cell selection between a cell within the first wireless network and a cell within the second wireless network if the controller fails to receive the signal indicative of the position of the mobile terminal at the selected gateway area.

22. The apparatus of claim 21 wherein the communication system comprises a cellular communication system having a first base station, a second base station, and a third base station, the first base station forming a portion of the first wireless network and defining a first cellular area, the second base station forming a first portion of the second wireless network and defining a second cellular area, and the third base station forming a second portion of the second wireless network and defining a third cellular area, the third cellular area including the selected gateway area defining the selected gateway, and wherein said detector comprises the third base station.

23. The apparatus of claim 28 wherein the cellular communication system further comprises a base station controller and wherein said controller coupled to receive the signal indicative of the position of the mobile terminal comprises at least a portion of the base station controller of the cellular communication system.

24. The apparatus of claim 23 wherein the cell selection comprises a handover of ongoing communications by the mobile terminal between the first and second wireless networks, wherein said base station controller maintains a neighbor cell list associated with each of the first base station, the second base station, and the third base station, each neighbor cell list for identifying base stations to which ongoing communications with the base station to which the neighbor cell list is associated are eligible to be handed off.

25. The apparatus of claim 24 wherein only the neighbor cell list associated with the third base station forming said detector includes identification of the first and second base stations to which ongoing communications with the third base station are eligible to be handed off.

26. The apparatus of claim 24 wherein the neighbor cell list associated with the second base station includes identification of only the third base station to which ongoing communications with the second base station are eligible to be handed off.

27. The apparatus of claim 24 wherein the second base station further comprises a plurality of distributed antenna devices coupled thereto, the distributed antenna devices distributed about a subsystem area, and the second cellular area encompassing at least a first portion of the subsystem area.

28. The apparatus of claim 21 wherein the communication system comprises a cellular communication system, the first wireless network comprises a macrocellular network having at least one base station, and the second wireless network comprises a microcellular network having a central unit and a plurality of spaced-apart, remote antenna devices coupled thereto, and wherein said detector comprises a selected remote antenna device of the spaced-apart remote antenna devices of the spaced-apart remote antenna devices of the microcellular network.

29. The apparatus of claim 28 wherein said controller comprises the central unit of the microcellular network.

30. The apparatus of claim 29 wherein the remote antenna devices generate signals of signal characteristics indicative of the position of the mobile terminal within the area encompassed by the microcellular network, said controller permitting the communication to be handed-off between the microcellular network and the macrocellular network only when the signal generated by the selected remote antenna device indicates the position of the mobile terminal more proximate thereto than any other one of the remote antenna devices.

31. The apparatus of claim 28 wherein the mobile terminal performs mobile assisted handoff measurements and generated mobile-generated signals indicative thereof, and wherein said selected remote antenna device further provides indications of the mobile-generated signals received thereat to said controller.

32. An assembly for selectively permitting and prohibiting a handover of a communication with a mobile terminal from a first wireless network and a second wireless network, each network comprising at least one cell having a base station transceiver, said assembly comprising:

a detector positioned at, and defining a gateway area covered by one base station transceiver of the second wireless network;

a determiner coupled to receive indications of detection by said detector of positioning of the mobile terminal within the gateway area; and a handover controller operably responsive to determinations of said determiner, said handover controller for permitting said handover of said communication with said mobile terminal between a cell within the first wireless network and a cell within the second wireless network when the mobile terminal is determined to be within the gateway area and for prohibiting said handover of said communication with said mobile terminal between a cell within the first wireless system portion and a cell within the second wireless system portion when the mobile terminal is outside the gateway area.

* * * * *

UNITED STATES PATENT AND TRADEMARK OFFICE
CERTIFICATE OF CORRECTION

PATENT NO. :    5,920,818
DATED      :    Jul. 6, 1999
INVENTOR(S):    Frodigh et al.

It is certified that error appears in the above-identified patent and that said Letters Patent is hereby corrected as shown below:

Column 12, line 31      Replace "designers,"
                        With --designers'--

Signed and Sealed this

Sixteenth Day of May, 2000

Attest:

Q. TODD DICKINSON

Attesting Officer        Director of Patents and Trademarks